United States Patent
Lu et al.

(10) Patent No.: US 6,983,514 B2
(45) Date of Patent: Jan. 10, 2006

(54) PIVOT HINGE WITH POSITIONING FUNCTION

(75) Inventors: Sheng-Nan Lu, Shulin (TW);
Chung-Yu Lee, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 36 days.

(21) Appl. No.: 10/842,541

(22) Filed: May 11, 2004

(65) Prior Publication Data
US 2005/0251964 A1 Nov. 17, 2005

(51) Int. Cl.
*E05C 17/64* (2006.01)
*E05D 11/10* (2006.01)

(52) U.S. Cl. .............................. 16/342; 16/330; 16/303

(58) Field of Classification Search ................ 16/342, 16/303, 330, 327, 286, 338, 340, 273; 403/68, 403/71; 361/683, 807; 455/575.1, 575.3
See application file for complete search history.

(56) References Cited

U.S. PATENT DOCUMENTS

| | | | | |
|---|---|---|---|---|
| 4,845,809 A | * | 7/1989 | Pillifant, Jr. .................. | 16/259 |
| 5,022,778 A | * | 6/1991 | Lu .............................. | 403/120 |
| 5,632,066 A | * | 5/1997 | Huong ......................... | 16/338 |
| 5,923,751 A | * | 7/1999 | Ohtsuka et al. ......... | 379/433.13 |
| 6,163,928 A | * | 12/2000 | Chung ......................... | 16/342 |
| 6,230,365 B1 | * | 5/2001 | Lu .............................. | 16/342 |
| 6,321,416 B1 | * | 11/2001 | Lu .............................. | 16/374 |
| 6,393,662 B1 | * | 5/2002 | Huang et al. ................. | 16/273 |
| 6,470,532 B2 | * | 10/2002 | Rude ........................... | 16/335 |
| 6,584,646 B2 | * | 7/2003 | Fujita .......................... | 16/342 |
| 6,748,625 B2 | * | 6/2004 | Lu .............................. | 16/285 |
| 6,757,940 B2 | * | 7/2004 | Lu et al. ....................... | 16/330 |
| 2005/0155183 A1 | * | 7/2005 | Lu et al. ....................... | 16/340 |

FOREIGN PATENT DOCUMENTS

JP 06159347 A * 6/1994

* cited by examiner

*Primary Examiner*—Chuck Y. Mah
*Assistant Examiner*—Mark T. Vogelbacker
(74) *Attorney, Agent, or Firm*—Fei-Fei Chao; Bingham McCutchen LLP

(57) ABSTRACT

A pivot hinge for a portable electronic device is disclosed. A base plate with a pivot tube is fixed on the main unit of the portable electronic device, and a locating bracket is fixed on the movable display panel. A shaft is inserted through the pivot tube, exposing the angular section from the other end of the pivot tube. A locking piece, a spring, and a ring are sequentially inserted over the angular section to complete the spring assembly. The interlocking of the tooth and notch enables the movable display panel to be placed in the horizontal direction over the main unit. A middle section of the shaft and the pivot tube are closely mated only when two plain facets respectively formed on the shaft and the pivot tube are matched up in the rotation of the shaft, thus abrasion damage is significantly reduced.

10 Claims, 3 Drawing Sheets

PIVOT HINGE WITH POSITIONING FUNCTION

BACKGROUND OF THE INVENTION

1. Field of the Invention

The present invention is related to a pivot hinge for portable electronic devices, and more particularly to a pivot hinge with positioning function.

2. Description of Related Art

Nowadays portable electronic devices such as notebook computers, personal translators, personal digital assistants (PDA) are well received by consumers. Notebook computers usually have a liquid crystal display (LCD) housed in a movable display panel, and a keyboard and a processing unit installed in a main unit. The movable display panel is coupled to the main unit by means of a pivotal mechanism, such that the user only has to flip up the movable display panel along the pivot in order to operate the notebook computer, and to flip down the movable display panel in order to close the notebook computer.

Basically, a conventional pivot hinge includes a shaft, a locking piece, and a base plate, where the locking piece has a notch that is used to engage a tooth extending from the base plate when the movable display panel is placed in the horizontal direction over the main unit. The pivot hinge is thus locked with the display panel in the horizontal direction but leaves a predetermined gap between the movable display panel and the main unit to keep the movable display panel from hitting the main unit, thus eliminating unnecessary damage to the LCD display.

However, since the conventional pivot is a circular rod, constant turning of the pivot hinge produces abrasion on the shaft and the base plate over a period of time, so the pivot hinge will eventually break down.

SUMMARY OF THE INVENTION

The main object of the present invention is to provide a pivot hinge that employs an interlocking tooth and a notch for positioning the movable display panel in the horizontal direction.

The second object of the invention is to provide a pivot hinge that can significantly reduce abrasion of the shaft against the pivot tube otherwise occurring due to constant turning of the pivot hinge. According to the present design, the pivot tube located on the base plate and the middle section of the shaft, each having a plain facet, will be closely mated only when the two plain facets are matched up in the rotation of the shaft around the tube wall of the pivot tube, that is when the pivot hinge is turned to the locking position.

To this end, the design of the pivot hinge is composed of a base plate, a shaft, a locating bracket, a spring, a ring, and a locking piece.

The base plate has one end fixed on the main unit of the portable electronic device, and a pivot tube attached on another end, where the pivot tube allows the shaft to extend through the hollow center during assembling of the spring, and the pivot tube has a gap on the tube wall.

The pivot tube has a plain facet traversing the tube from end to end, and a tooth extending outward from one end of the tube and falling in line with the plain facet.

The head end of the shaft forms an angular section with a locating block on the extremity, and the bottom end of the shaft forms a circular section also with a locating block on the extremity. The shaft has a plain facet on the surface of the middle section corresponding to the plain facet located on the tube wall of the pivot tube.

The locking piece has an oval hole in the center, and a notch on the perimeter of the flange, where the oval hole allows the head of the shaft to extend through from one end. The notch of the locking piece is to engage the tooth of the pivot tube as the pivot hinge is turned to the locking position.

The locating bracket has an oval hole and several circular holes, where the circular holes are used to fix the bracket on the movable display panel of the portable electronic device, and the oval hole is to secure the bottom end of the shaft using the locating block.

When assembling the spring, the head end of the shaft is to be inserted through the pivot tube, so that the middle section of the shaft is hidden behind the tube wall of the pivot tube, and the angular section, the head end of the shaft, comes out from the other end of the pivot tube. Then, a locking piece, a spring and a ring are sequentially passed over the angular section of the shaft.

When the movable display panel is placed in the horizontal direction over the main unit, the pivot hinge is in the locking position, that means the tooth and the notch are engaged, and the middle section of the shaft and the pivot tube are closely mated as the plain facet of the middle section of the shaft and the plain facet located on the pivot tube are matched up.

The use of the interlocking tooth and notch enables the movable display panel to be placed in the horizontal direction over the main unit, but leaving a predetermined gap between the movable display panel and the main unit, so as to keep the movable display panel from hitting the main unit when the movable display panel is folded down. Each having a plain facet on the surface, the middle section of the shaft and the pivot tube will be closely mated only when the two plain facets are matched up in the rotation of the shaft, thus this can reduce abrasion of the shaft against the pivot tube otherwise occurring due to constant turning and improve the positioning effect.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
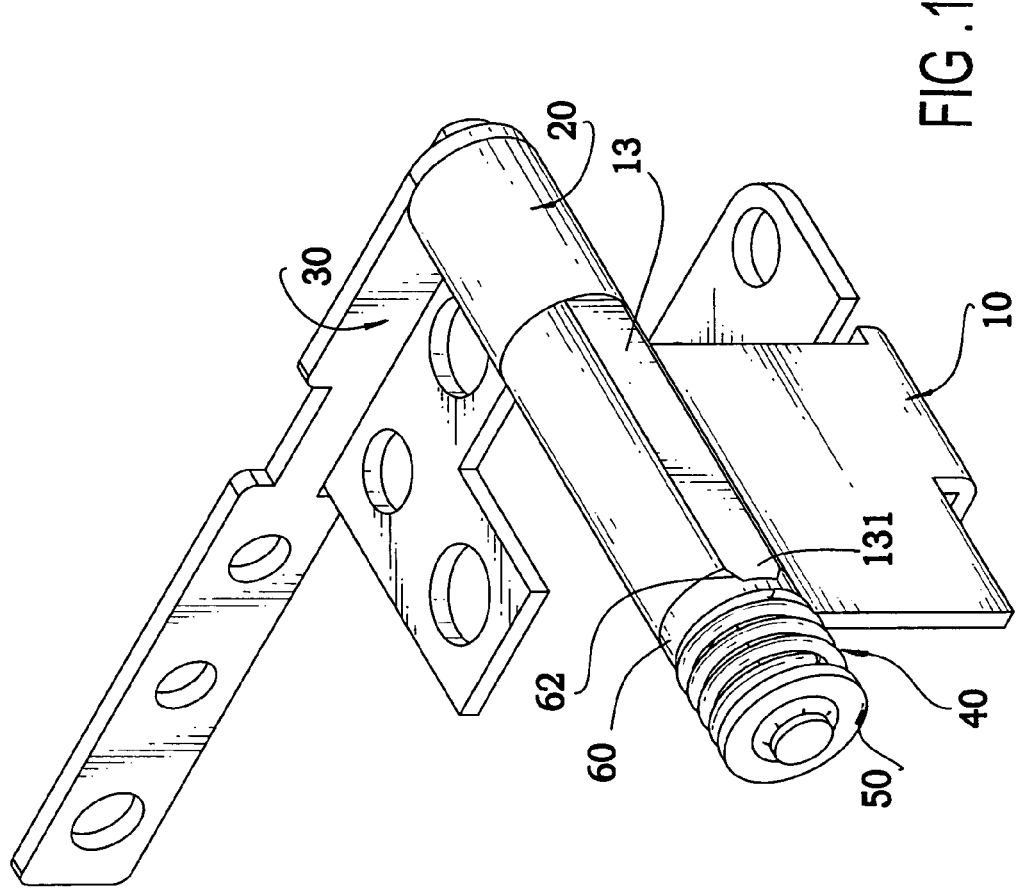
FIG. 1 is a perspective view of the present invention.

The present invention is illustrated through a preferred embodiment as shown in FIG. 1, in which a pivot hinge, used to couple the movable display panel to the main unit of the portable electronic device, comprises a base plate (10), a shaft (20), a locating bracket (30), a spring (40), a ring (50) and a locking piece (60).

Figure 2:
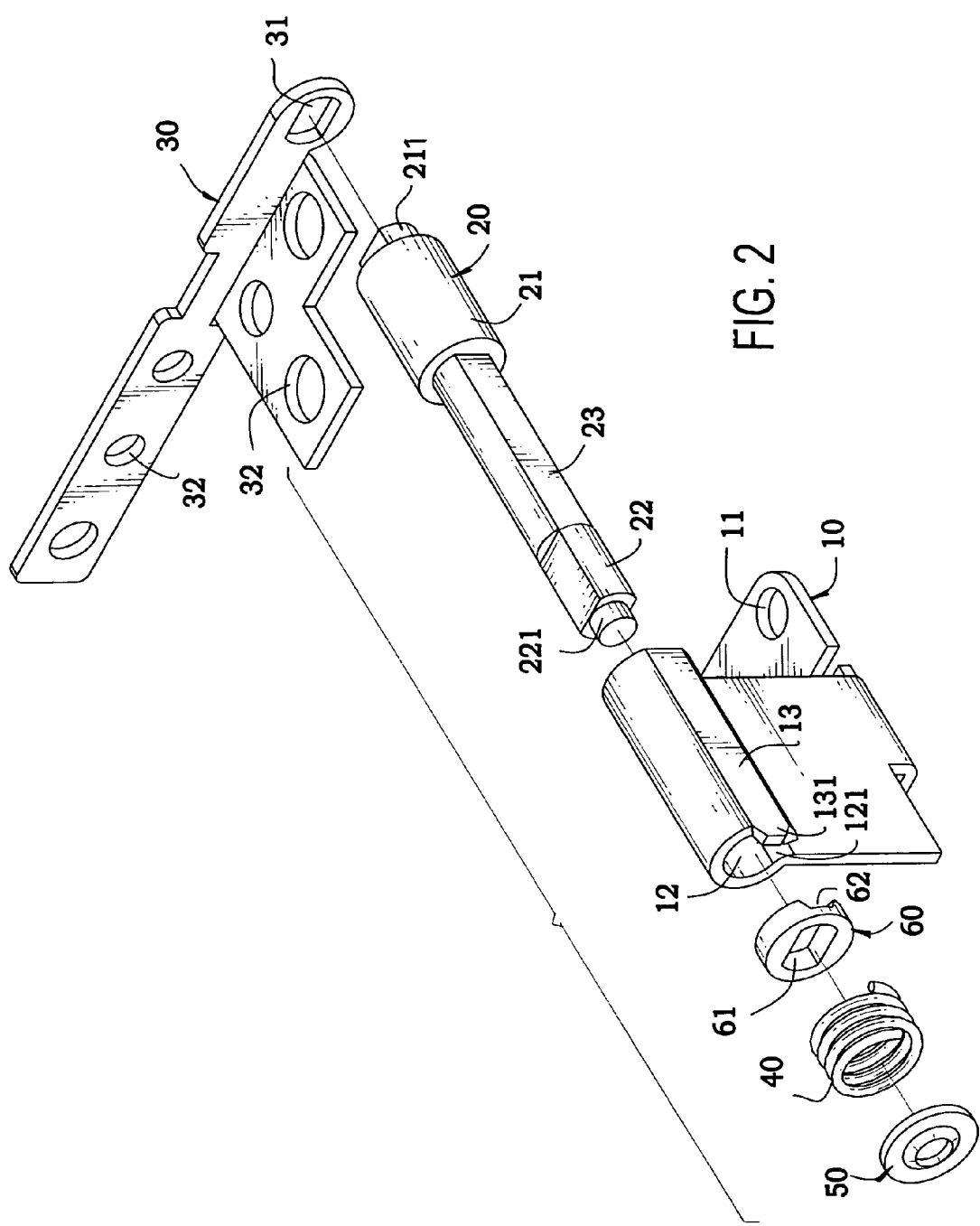
FIG. 2 is an exploded diagram of the pivotal hinge.

The base plate (10), as shown in FIG. 2, is an L-shaped metal plate, with several locating holes (11) on one end and a pivot tube (12) on the other end. The pivot tube (12) has a gap (121) on the tube wall to form a semi-closed cylinder that allows the head end of the shaft (20) to pass through during assembling of the spring. The pivot tube (12) also has a plain facet (13) on the surface, and a cone-shaped tooth (131) that extends from one end of the pivot tube (12) and is in line with the plain facet (13).

The locking piece (60) has an oval hole (61) in the center, and a notch (62) on the perimeter of the flange corresponding to the position of the tooth (131) extending from one end of the pivot tube (12). The interlocking of the tooth (131) and the notch (62) allows the base plate (10) and the shaft (20) to be engaged when the movable display panel is placed in the horizontal direction.

The bottom end of the shaft (20), as shown in FIG. 2, forms a circular section (21) with a locating block (211) on the extremity, where the diameter of the circular section (21) is equal to or larger than the diameter of the pivot tube (12) on the base plate (10). The head end of the shaft (20) forms an angular section (22) with a locating block (221) on the extremity, which is to be inserted through the pivot tube (12) from end to end and comes out on the other end, exposing the angular section (22) of the shaft (20), and the middle section with a plain facet (23) is completely covered by the pivot tube (12) of the base plate (10). The middle section of the shaft (20) and the pivot tube (12) are closely mated only when the two plain facets (13) (23) are matched up in the rotation of the shaft (20). The diameter of the angular section (22) of the shaft (20) is slightly smaller than the internal diameter of the pivot tube (12) of the base plate (10).

When assembling the spring, the head end of the shaft (20) is inserted in one end of the pivot tube (12) and comes out from the other end exposing the angular section (22). Then, a locking piece (60) is mounted over the angular section (22) of the shaft (20). Then, the spring (40) and the ring (50) are sequentially mounted over the angular section (22) of the shaft (20) to clamp down the spring assembly.

The bottom end of the shaft is a circular section (21) with a locating block (211) at the extremity, which is to be inserted through an oval hole (31) located on the locating bracket (30), and several round locating holes (32) on the other end are used to fix the locating bracket (30) on the movable display panel of the portable electronic device.

In assembling the pivot hinge, as shown in FIG. 2, the head end of the shaft (20) is inserted in one end of the pivot tube (12) and comes out on the other end exposing the angular section (22). The locking piece (60) is then mounted over the angular section (22) through the oval hole (61), and then the spring (40) is inserted over the angular section (22), and finally the ring (50) is inserted over the head of the shaft (20) to clamp down the spring assembly. The bottom end of the shaft with the circular section (21) is secured to the locating bracket (30) by inserting the locating block (211) of the shaft (20) through the oval hole (31). Thereafter, the base plate (10) is fixed on the main unit of the portable electronic device through several locating holes (11), and the locating bracket (30) is fixed on the movable display panel of the portable electronic device through several locating holes (32).

Figure 3:
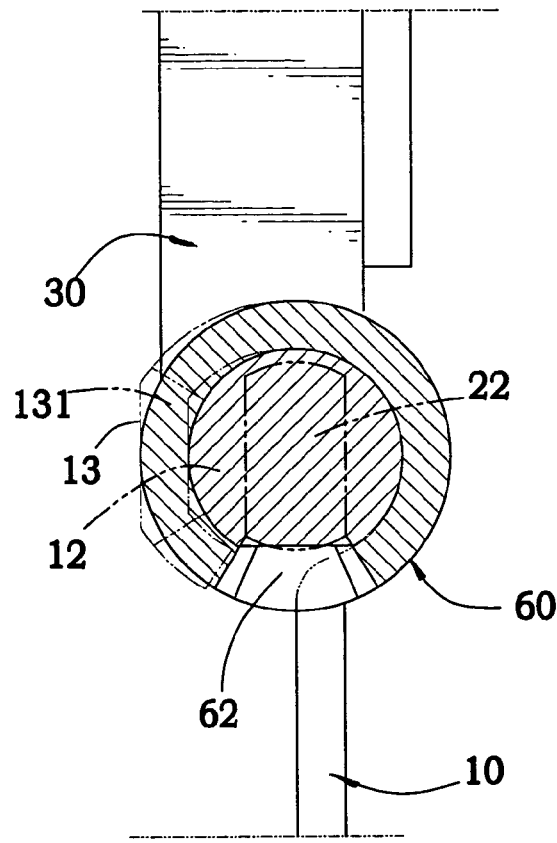
FIG. 3 is a cross-sectional view of the pivotal hinge in the fully open position.
Figure 4:
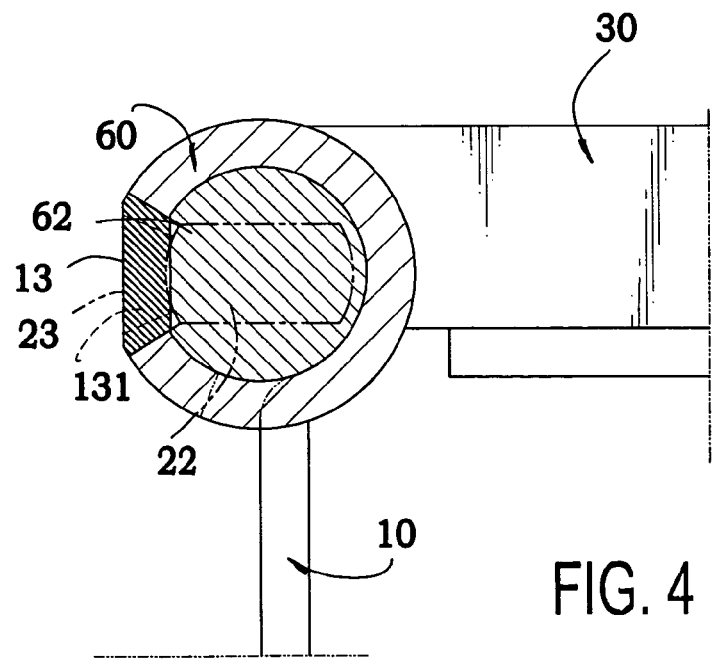
FIG. 4 is a cross-sectional view of the pivotal hinge in the locking position.

When the movable display panel is flipped upward, as shown in FIG. 3, the locating bracket (30) causes the shaft (20) to rotate in the forward direction, and the locking piece (60) to rotate in step with the shaft (20). Since the tooth (131) is not engaged, the movable display panel is free to be moved to any position. When the movable display panel is folded down, as shown in FIG. 4, the locating bracket (30) causes the shaft (20) to rotate in the reverse direction, followed by the locking piece (60) to rotate in step, until the tooth (131) is engaged in the notch (62), so that the movable display panel can be placed in the horizontal direction over the main unit without damaging the display panel. The middle section of the shaft (20) and the pivot tube (12) of the base plate (10) are closely mated only when the two plain facets (13) (23) are matched up in the rotation of the shaft (20), without causing abrasion damage to the shaft (20) and the pivot tube (12) due to constant turning of the pivot hinge.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pivot hinge comprising a base plate (10), a shaft (20), a spring (40), a ring (50) and a locking piece (60), wherein
   the base plate (10) has a first end defined with plural locating holes (11) for securing the pivot hinge onto an electronic device, and has a pivot tube (12) formed on a second end of the base plate (10), wherein the pivot tube (12) defines a gap (121) having an edge from which a first plain facet (13) extends, and a tooth (131) erects from a first end of the first plain facet (13);
   the locking piece (60) has an oval hole (61) defined in its center, and a notch (62) defined on a perimeter of the locking piece (60) to correspond to the tooth (131) when the notch (62) and the tooth (131) are engaged;
   the shaft (20) has a head end, a bottom end and a middle section connected between the head end and the bottom end, wherein the middle section having an external surface on which a second plain facet (23) is formed, and an angular section (22) with a locating block (221) is formed on the head end of the shaft (20) to be inserted through the oval hole (61) of the locking piece (60);
   the middle section of the shaft (20) and the pivot tube (12) are closely mated only when the second plain facet (23) and the first plain facet (13) are correspondingly matched up in rotation of the shaft (20) around the pivot tube (12); and
   the head end of the shaft (20) is inserted in the pivot tube (12) so that the middle section of the shaft (20) is received in the pivot tube (12) and the angular section (22) is exposed, whereafter the locking piece (60), the spring (40) and the ring (50) are sequentially mounted over the exposed angular section (22) of the shaft (20).

2. The pivot hinge according to claim 1, wherein a cone shaped spur extends outward from the pivot tube (12) to form the tooth (131) to engage the notch (62) oil the locking piece (60) when the pivot hinge is in the locking position.

3. The pivot hinge according to claim 2, wherein the angular section (22) has a first end connected to the middle section of the shaft (20) and has a second end to which the locating block (221) is formed, wherein a diameter of the angular section is equal to an external diameter of the pivot tube (12).

4. The pivot hinge according to claim 3, wherein the pivot hinge further has a locating bracket (30) defined with an oval hole (31), wherein a locating block (211) extending from a circular section (21) forms two flat opposite surfaces and is inserted through the oval hole (31) of the locating bracket (30) in order to secure the shaft (20) in assembling the pivot hinge.

5. The pivot hinge according to claim 4, wherein the base plate (10) has at least one locating hole (11) defined in one end of the base plate for fixing the base plate (10) onto a portable electronic device.

6. The pivot hinge according to claim 5, wherein the locating bracket (30) has multiple locating holes (32) for fixing the locating bracket (30) onto the electronic device.

7. The pivot hinge according to claim 1, wherein the angular section (22) has a first end connected to the middle section of the shaft (20) and has a second end to which the locating block (221) is formed, wherein a diameter of the angular section is equal to an external diameter of the pivot tube (12).

8. The pivot hinge according to claim 7, wherein the pivot hinge further has a locating bracket (30) defined with an oval hole (31), wherein a locating block (211) extending from a circular section (21) forms two flat opposite surfaces and is inserted through the oval hole (31) of the locating bracket (30) in order to secure the shaft (20) in assembling the pivot hinge.

9. The pivot hinge according to claim 8, wherein the base plate (10) has at least one locating hole (11) defined in one end of the base plate for fixing the base plate (10) onto an electronic device.

10. The pivot hinge according to claim 9, wherein the locating bracket (30) has multiple locating holes (32) for fixing the locating bracket (30) onto the electronic device.

\* \* \* \* \*